(12) United States Patent
Shibahara et al.

(10) Patent No.: US 11,440,499 B2
(45) Date of Patent: Sep. 13, 2022

(54) SIDE AIRBAG DEVICE

(71) Applicants: MAZDA MOTOR CORPORATION, Aki-gun (JP); ASHIMORI INDUSTRY CO., LTD., Settsu (JP)

(72) Inventors: Taei Shibahara, Aki-gun (JP); Toshihiro Takebayashi, Aki-gun (JP); Yuichi Sugimura, Aki-gun (JP); Motoharu Hirata, Aki-gun (JP); Hidetaka Azuma, Settsu (JP); Yuta Minami, Settsu (JP); Yoshitaka Okagami, Settsu (JP); Kazuya Hashimoto, Settsu (JP)

(73) Assignees: MAZDA MOTOR CORPORATION, Aki-gun (JP); ASHIMORI INDUSTRY CO., LTD., Settsu (JP)

( * ) Notice: Subject to any disclaimer, the term of this patent is extended or adjusted under 35 U.S.C. 154(b) by 0 days.

(21) Appl. No.: 17/211,929

(22) Filed: Mar. 25, 2021

(65) Prior Publication Data
US 2021/0300293 A1 Sep. 30, 2021

(30) Foreign Application Priority Data
Mar. 30, 2020 (JP) .............................. JP2020-060783

(51) Int. Cl.
*B60R 21/231* (2011.01)
*B60R 21/20* (2011.01)
*B60R 21/00* (2006.01)

(52) U.S. Cl.
CPC ........ *B60R 21/23138* (2013.01); *B60R 21/20* (2013.01); *B60R 2021/0006* (2013.01);
(Continued)

(58) Field of Classification Search
CPC ............ B60R 21/23138; B60R 21/207; B60R 2021/0006
See application file for complete search history.

(56) References Cited

U.S. PATENT DOCUMENTS 8,282,126 B2    10/2012  Wiik et al.
8,448,981 B2 *   5/2013  Fukawatase .......... B60R 21/233
                                                        280/730.2
(Continued)

FOREIGN PATENT DOCUMENTS

DE    10 2011 084 093 A1    4/2012
DE    10 2016 115 408 A1    1/2020
(Continued)

*Primary Examiner* — Faye M Fleming
(74) *Attorney, Agent, or Firm* — Oblon, McClelland, Maier & Neustadt, L.L.P.

(57) ABSTRACT

A side airbag device includes an inflator; and a bag-shaped airbag inflatable and deployable in response to a gas upon activation of the inflator. The airbag includes a torso protection portion inflatable and deployable in a space beside a torso of the occupant, a support portion provided on a console box side of the torso protection portion and configured to be pushed onto a top surface of the console box in an inflated and deployed state, and a hip protection portion inflatable and deployable between a hip of the occupant and a lateral portion of the console box. The support portion and the hip protection portion are defined by a continuous chamber. The inflator is positioned from above to below the support portion in a side view of the vehicle. The airbag is mounted on a lateral portion of the vehicle seat via the inflator.

7 Claims, 5 Drawing Sheets

(52) U.S. Cl.
CPC ................ *B60R 2021/0044* (2013.01); *B60R 2021/0048* (2013.01); *B60R 2021/0055* (2013.01)

(56) References Cited

U.S. PATENT DOCUMENTS

| | | | |
|---|---|---|---|
| 8,851,511 B1 * | 10/2014 | Volkmann | B60R 21/23138 280/730.2 |
| 9,016,718 B2 * | 4/2015 | Fukawatase | B60R 21/23138 280/730.2 |
| 9,994,185 B2 * | 6/2018 | Deng | B60R 21/2338 |
| 10,759,374 B2 * | 9/2020 | Yoo | B60R 21/23138 |
| 11,066,036 B2 * | 7/2021 | Gwon | B60R 21/231 |
| 2012/0091697 A1 * | 4/2012 | Wiik | B60R 21/23138 280/730.2 |

FOREIGN PATENT DOCUMENTS

| | | | | |
|---|---|---|---|---|
| DE | 10 2018 211 851 A1 | 1/2020 | | |
| JP | 2014-69729 A | 4/2014 | | |
| JP | 2014-108740 A | 6/2014 | | |
| JP | 2017-87991 A | 5/2017 | | |
| WO | WO-2016045785 A1 * | 3/2016 | ........... | B60R 21/237 |
| WO | WO 2019/228898 A1 | 12/2019 | | |
| WO | WO-2021176916 A1 * | 9/2021 | ........... | B60R 21/207 |

\* cited by examiner

SIDE AIRBAG DEVICE

CROSS-REFERENCE TO RELATED APPLICATIONS

The present application claims priority under 35 U.S.C. § 119 to Japanese Patent Application No. 2020-060783 filed on Mar. 30, 2020, the contents of which are incorporated herein by reference in their entirety.

BACKGROUND OF THE INVENTION

Field of the Invention

The present invention relates to side airbag devices. More specifically, the present invention relates to a side airbag device that inflates and deploys in a space beside an occupant during a lateral collision of a vehicle such as an automobile.

Discussion of the Background

Side airbag devices are known to prevent an occupant, in a lateral collision of a vehicle, from moving to an inner side in a vehicle width direction and coming into contact with an occupant in the next seat.

For example, JP 2014-108740 A discloses a vehicle occupant restraint system that can effectively restrict movement of an airbag to an inner side in a vehicle width direction during restraint of an occupant. This vehicle occupant restraint system is described to have the sub bag abutted against the console box to restrict the main bag from moving to the inner side in the vehicle width direction when the main bag receives the occupant, thereby restricting movement of the occupant.

WO 2019/228898 discloses an airbag to assist in keeping an occupant in the correct position during a lateral collision of a vehicle.

SUMMARY OF THE INVENTION

The sub bag in the vehicle occupant restraint system disclosed in JP 2014-108740 A is abutted against a corner of the console box. The main bag and the sub bag therefore would pivot about the corner of the console box until the top surface of the console box and the sub bag are abutted against each other. It would therefore take some time for the system to stop the movement of the occupant to the inner side in the vehicle width direction, resulting in a large amount of occupant movement.

An airbag of a conventional side airbag device also tends to inflate and deploy at a shifted position relative to the corner of the console box when the airbag swings due to rapid inflation and deployment, possibly failing to restrict movement of the occupant to the inner side in the vehicle width direction in an early stage. For example, the airbag disclosed in WO 2019/228898 can be improved by resolving this issue.

The present invention was made in response to the above issue, and aims to provide a side airbag device capable of restricting movement of an occupant to an inner side in a vehicle width direction in an early stage.

One aspect of the present invention relates to a side airbag device including: an inflator configured to generate a gas; and a bag-shaped airbag inflatable and deployable in a space above a console box and beside an occupant seated in a vehicle seat in response to the gas upon activation of the inflator to protect a lateral portion of the occupant, the console box provided on an inner side in a vehicle width direction relative to the vehicle seat, the airbag including a torso protection portion inflatable and deployable in a space beside a torso of the occupant, a support portion provided on a console box side of the torso protection portion and configured to be pushed onto a top surface of the console box in an inflated and deployed state, and a hip protection portion inflatable and deployable between a hip of the occupant and a lateral portion of the console box, the support portion and the hip protection portion being defined by a continuous chamber, the inflator being positioned from above to below the support portion in a side view of the vehicle, the airbag being mounted on a lateral portion of the vehicle seat via the inflator.

The present invention can provide a side airbag device capable of restricting movement of an occupant to an inner side in a vehicle width direction.

DESCRIPTION OF EMBODIMENTS

The side airbag device of an embodiment of the present invention is described with reference to the drawings.

The directions herein are described relative to a vehicle unless otherwise mentioned. For example, the "front side" indicates a side based on the forward direction of the vehicle; the "rear side" indicates a side based on the backward direction of the vehicle; the "upper side" indicates a side based on the upward direction of the vehicle; and the "lateral side" indicates a side based on the inward direction of a vehicle width direction. The arrow FR, the arrow UP, the arrow IN, and the arrow OUT drawn in the figures as appropriate respectively indicate the forward direction of the vehicle, the upward direction of the vehicle, the inward direction of the vehicle width direction, and the outward direction of the vehicle width direction. The members placed inside a vehicle seat are illustrated in see-through figures of the vehicle seat.

(Before Inflation and Deployment)

Figure 1:
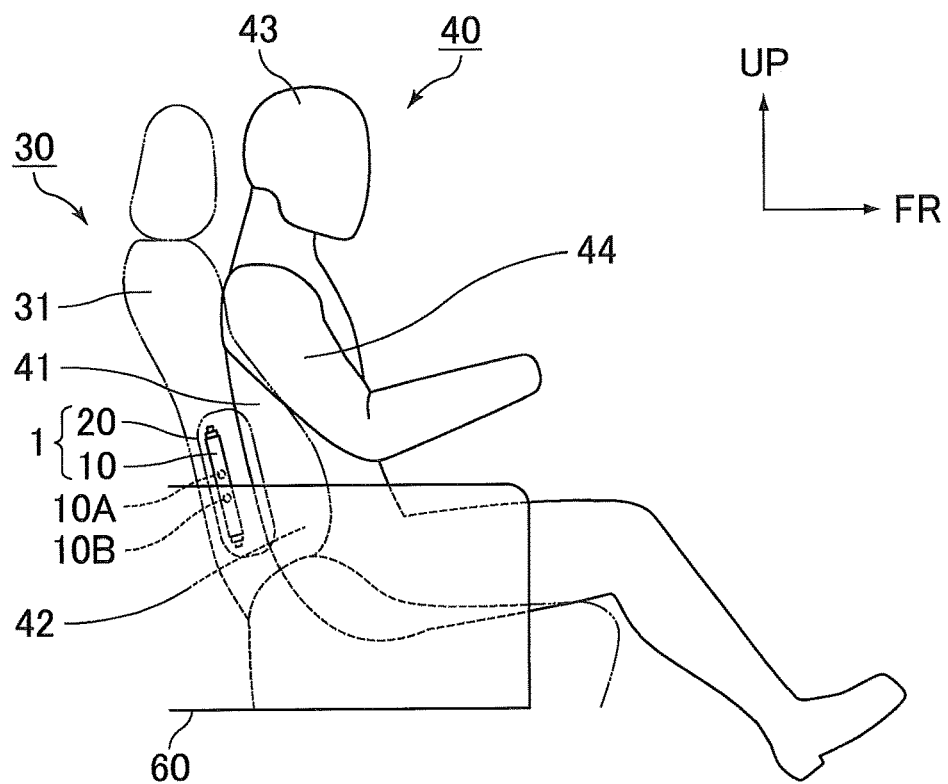
FIG. 1 is a schematic side view of a side airbag device of an embodiment before inflation and deployment of an airbag.
Figure 2:
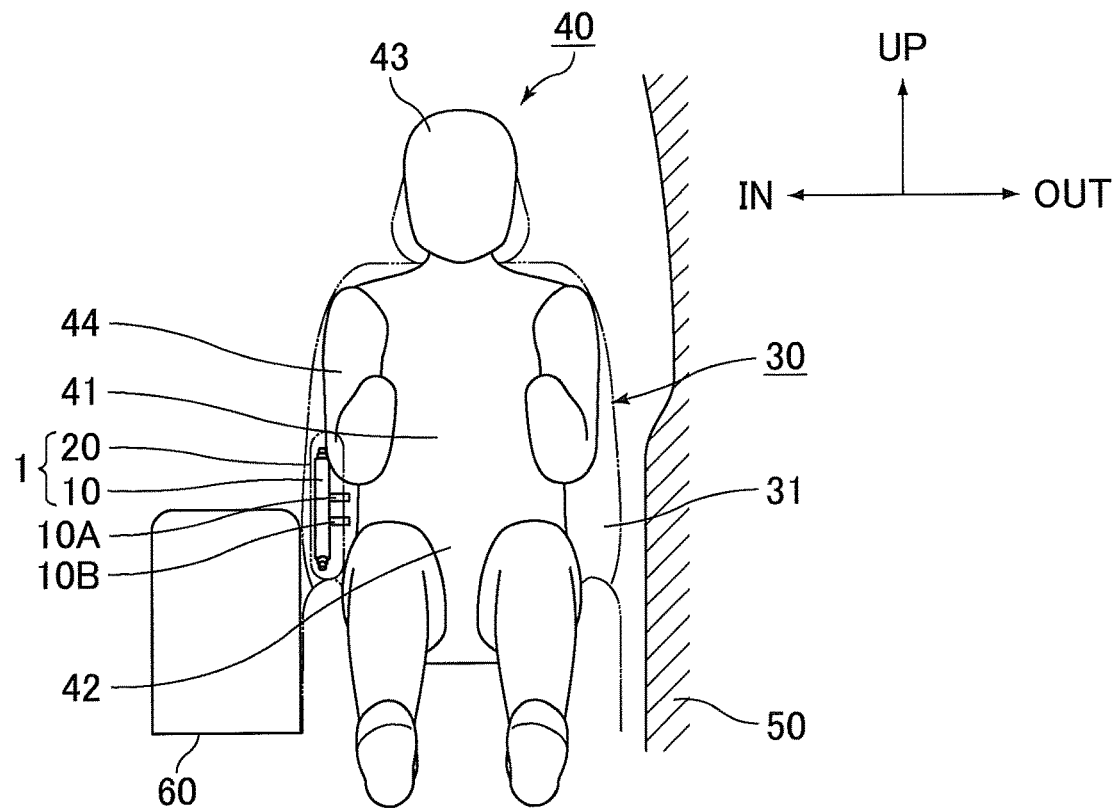
FIG. 2 is a schematic front view of the side airbag device of the embodiment before inflation and deployment of the airbag.

FIG. 1 is a schematic side view of a side airbag device of an embodiment before inflation and deployment of an airbag. FIG. 2 is a schematic front view of the side airbag device of the embodiment before inflation and deployment of the airbag.

As shown in FIG. 1 and FIG. 2, a side airbag device 1 is mounted on a lateral portion (lateral portion on an inner side in a vehicle width direction) of a seatback (backrest) 31 of a vehicle seat 30.

The vehicle seat 30 may be a driver's seat or a passenger seat of a vehicle, for example.

The side airbag device 1 includes an inflator 10 and an airbag 20.

The inflator 10 is provided inside the airbag 20. Specifically, the whole inflator 10 is provided inside the airbag 20. The inflator 10 is a cylindrical (columnar) gas-generating device, and is provided along the extending direction (height direction) of the seatback 31. A pair of bolts 10A and 10B protrudes from upper and lower portions of the inflator 10, and this pair of bolts 10A and 10B penetrates the airbag 20. The bolts 10A and 10B fix the inflator 10 to the lateral portion (e.g., side frame) of the seatback 31.

The inflator 10 is activated in a lateral collision of the vehicle. Specifically, first, when an impact sensor mounted on the vehicle detects the lateral collision of the vehicle, the sensor transmits a signal to an electronic control unit (ECU) and the ECU calculates and determines the collision level. If the determined collision level corresponds to a level at which the side airbag 20 should be inflated, the inflator 10 is ignited to generate a gas by a chemical reaction due to combustion. The gas generated in the inflator 10 is then introduced into the airbag 20.

The inflator 10 may be of any type, and may be a pyrotechnic inflator which utilizes a gas generated by combusting a gas-generating agent, a stored gas inflator utilizing a compressed gas, or a hybrid inflator utilizing a gas mixture of a gas generated by combusting a gas-generating agent and a compressed gas, for example.

The airbag 20 houses the inflator 10. The airbag 20 before inflation and deployment is mounted in a folded state on the lateral portion of the vehicle seat 30, which is the lateral portion of the seatback 31 herein, via the inflator 10, and is stored together with a cushion pad while being covered with the outer layer of the seatback 31.

Figure 3:
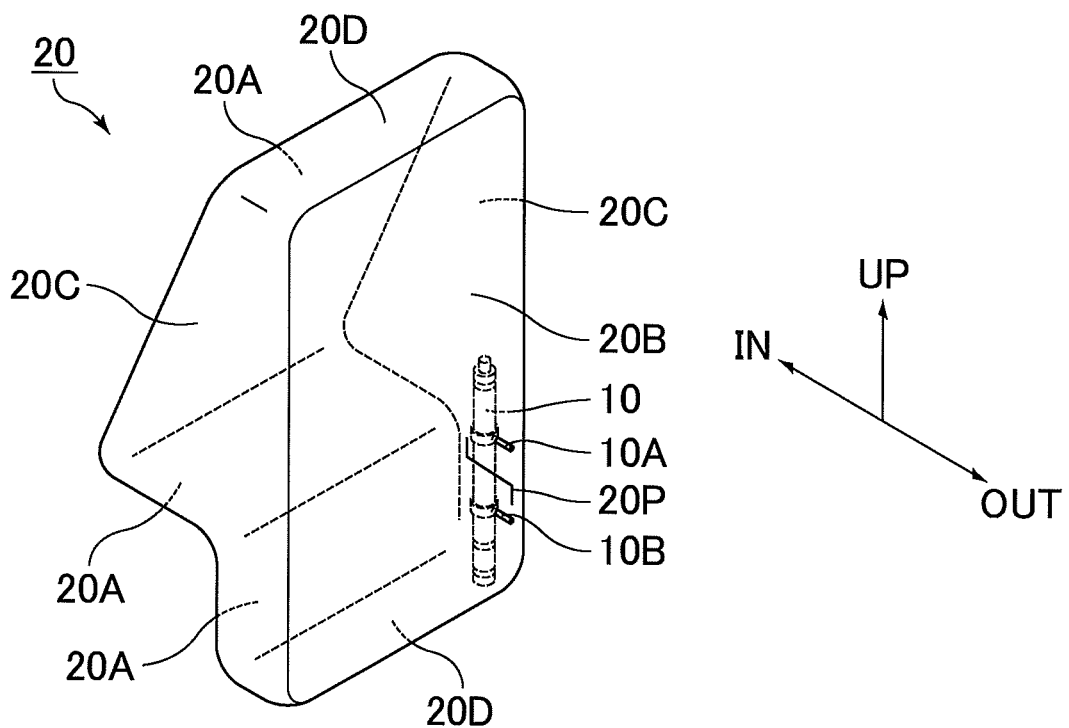
FIG. 3 is a schematic perspective view showing an example of a deployed state of the airbag in FIG. 2.

FIG. 3 is a schematic perspective view showing an example of a deployed state of the airbag in FIG. 2. As shown in FIG. 3, the airbag 20 has a bag shape. The airbag 20 is formed into a three-dimensional bag shape by joining the peripheries of base fabric pieces together. Specifically, the airbag 20 shown in FIG. 3 is prepared by joining the peripheries of a non-occupant side base fabric piece 20A on the inner side in the vehicle width direction, an occupant side base fabric piece 20B on the outer side in the vehicle width direction, middle base fabric pieces 20C on the front and rear sides in the vehicle, and base fabric pieces 20D on the upper and lower sides in the vehicle. As is clear from comparison with the later-described FIG. 6 and FIG. 8, the non-occupant side base fabric 20A is partly bended along the top surface and side surface of the console box 60. The middle base fabric pieces 20C each have a shape extending along the top surface and side surface of the console box 60 in a front-rear view of the vehicle.

Figure 4:
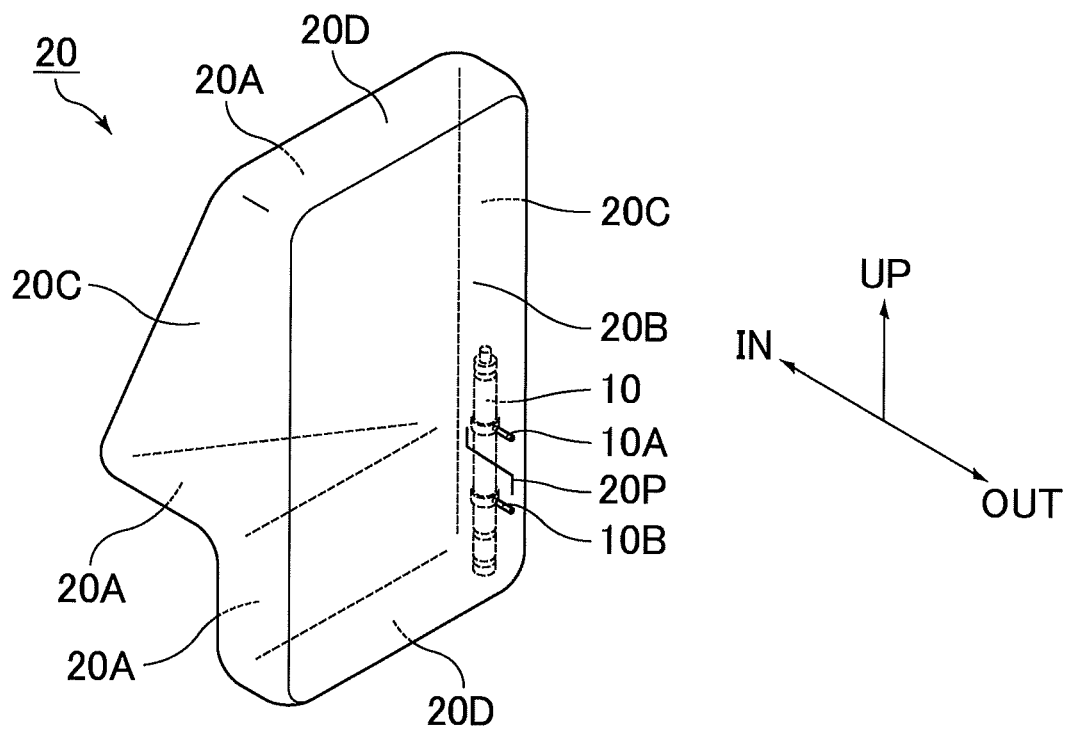
FIG. 4 is a schematic perspective view showing another example of the deployed state of the airbag in FIG. 2.

Of the base fabric pieces of the airbag 20 on the front and rear sides in the vehicle, the base fabric piece on the front side in the vehicle preferably has a shape extending along the top surface and side surface of the console box 60 in a front-rear view of the vehicle. FIG. 4 is a schematic perspective view showing another example of the deployed state of the airbag in FIG. 2. Of the middle fabric pieces 20C of the airbag 20 shown in FIG. 4 on the front and rear sides in the vehicle, the base fabric piece on the front side in the vehicle has a shape extending along the top surface and side surface of the console box 60 in a front-rear view of the vehicle. The airbag 20 as shown in FIG. 4 can have a more reduced volume than the airbag 20 as shown in FIG. 3.

The occupant side base fabric piece 20B of the airbag 20 is provided with an inflator insertion opening 20P through which the inflator 10 is inserted into the airbag 20. FIG. 3 and FIG. 4 each show a case where the inflator insertion opening 20P has a slit shape. There are bolt holes above and below the inflator insertion opening 20P, which allow the pair of bolts 10A and 10B to protrude out of the airbag 20 from the bolt holes after the whole inflator 10 is inserted into the airbag 20 through the inflator insertion opening 20P. Then, the airbag 20 in a folded state is mounted on the lateral portion of the seatback 31 via the inflator 10, so that the inflator insertion opening 20P comes opposite the seatback 31. Thereby, the inflator insertion opening 202 is closed by the seatback 31 in inflation and deployment of the airbag 20, preventing leakage of a gas from the airbag 20.

The base fabric pieces used in the airbag 20 may be pieces of cloth formed by weaving yarn such as yarn of nylon 66 or yarn of polyethylene terephthalate. In order to improve the heat resistance and the airtightness, the surfaces of the base fabric pieces may be coated with an inorganic substance such as silicon.

The joining in formation of the base fabric pieces may be performed by any technique, such as sewing, bonding, welding, or any combination thereof.

In the present embodiment, a world side impact dummy (World-SID) 40 is seated in the vehicle seat 30. The sitting position of the world side impact dummy 40 is in conformity with the side impact test (ECE R95) used in Japan and Europe or the side impact test (FMVSS214) used in the U.S. at present. The position and size of an airbag 20 in an inflated and deployed state are determined in accordance with the positions of parts such as a torso 41, a hip 42, a head 43, and an arm 44 of the world side impact dummy 40 shown in FIG. 1. The world side impact dummy 40 is hereinafter referred to as the "occupant 40".

The vehicle sidewall 50 may be any vehicle part placed on the outer side in the vehicle width direction relative to the occupant 40 seated in the vehicle seat 30 (the side opposing the console box 60), and collectively refers to parts such as side doors, pillars, and side windows.

The console box 60 is provided on the inner side in the vehicle width direction relative to the vehicle seat 30. For example, the console box 60 is provided in the central portion in the vehicle width direction between the driver's seat and the passenger seat. The console box 60 may function as an armrest that supports the arm 44 on the inner side in the vehicle width direction of the occupant 40.

(Early Stage of Occupant Restraint)

Figure 5:
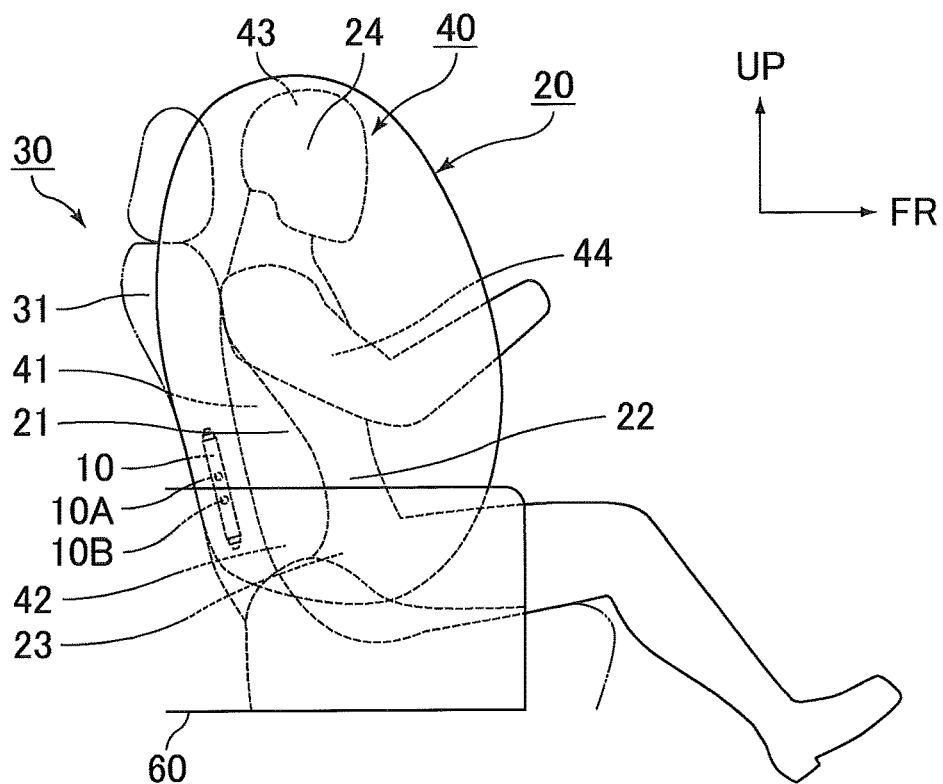
FIG. 5 is a schematic side view of the side airbag device of the embodiment in an early stage of occupant restraint by the airbag.
Figure 6:
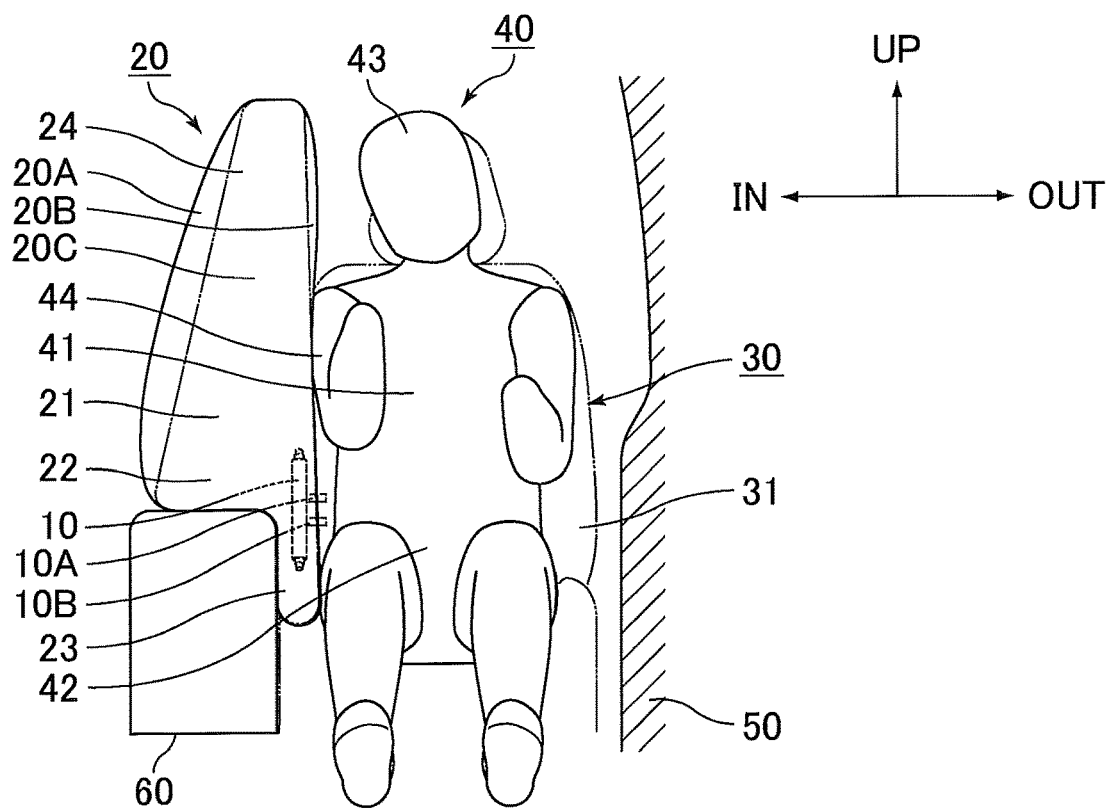
FIG. 6 is a schematic front view of the side airbag device of the embodiment in the early stage of occupant restraint by the airbag.

FIG. 5 is a schematic side view of the side airbag device of the embodiment in an early stage of occupant restraint by the airbag. FIG. 6 is a schematic front view of the side airbag device of the embodiment in the early stage of occupant restraint by the airbag.

When a vehicle has a lateral collision with an obstacle (e.g., another vehicle), specifically, when an obstacle collides with a vehicle sidewall opposing a vehicle sidewall 50 in the vehicle width direction (when the vehicle seat 30 is the driver's seat, the vehicle body portion on the outer side in the vehicle width direction relative to the passenger seat) and the inflator 10 is activated, the gas generated by the inflator 10 is introduced into the airbag 20 and the airbag 20 inflates while unfolded. The force applied from the inflated airbag 20 then tears open the outer layer of the seatback 31. Thereby, as shown in FIG. 5 and FIG. 6, the airbag 20 inflates and deploys in a space above the console box 60 and beside the occupant 40 seated in the vehicle seat 30 to protect the lateral portion of the occupant 40. The airbag 20 configured to inflate and deploy in this manner is also referred to as a far-side airbag.

In a lateral collision of the vehicle, the occupant 40 seated in the vehicle seat 30 leans, while moving, toward the inner side in the vehicle width direction with the hip 42 at the center. Meanwhile, in the lateral collision of the vehicle, the airbag 20 inflates and deploys to have a torso protection portion 21, a support portion 22, and a hip protection portion 23. When the airbag 20 inflates and deploys, the torso protection portion 21 inflates and deploys in a space beside the torso 41 of the occupant 40 to come into contact with the torso 41. The support portion 22 is provided on the console box 60 side of the torso protection portion 21 and inflates and deploys to come into contact with the top surface of the console box 60. The hip protection portion 23 inflates and deploys between the hip 42 of the occupant 40 and the lateral portion of the console box 60.

In the inflated and deployed state of the airbag 20, the support portion 22 and the hip protection portion 23 preferably extend along the top surface and side surface of the console box 60, respectively, in a front-rear view of the vehicle. For example, in the airbag 20 as shown in FIG. 6, in a front-rear view of the vehicle, the middle base fabric piece 20C has a shape extending along the top surface and side surface of the console box 60, and thus the support portion 22 inflates and deploys along the top surface of the console box 60 while keeping in contact with the top surface of the console box 60. The hip protection portion 23 inflates and deploys along the side surface of the console box 60 while keeping in contact with the side surface of the console box 60 in a front-rear view of the vehicle.

The support portion 22 and the hip protection portion 23 are defined by a continuous chamber. The expression "parts (here, the support portion 22 and the hip protection portion 23) of the airbag 20 are defined by a continuous chamber" means that no wall partitioning the chamber is provided at the boundary between the parts of the airbag 20 or these parts are not formed using a plurality of bags. With the support portion 22 and the hip protection portion 23 defined by a continuous chamber, occurrence of a motion such as distortion between the support portion 22 and the hip protection portion 23 can be prevented as compared to, for example, the case where the hip protection portion 23 is formed by joining bag-shaped sub bags. As a result, the airbag 20 readily inflates and deploys at the support portion 22 and the hip protection portion 23, restraining the occupant 40 in an early stage.

(Late Stage of Occupant Restraint)

Figure 7:
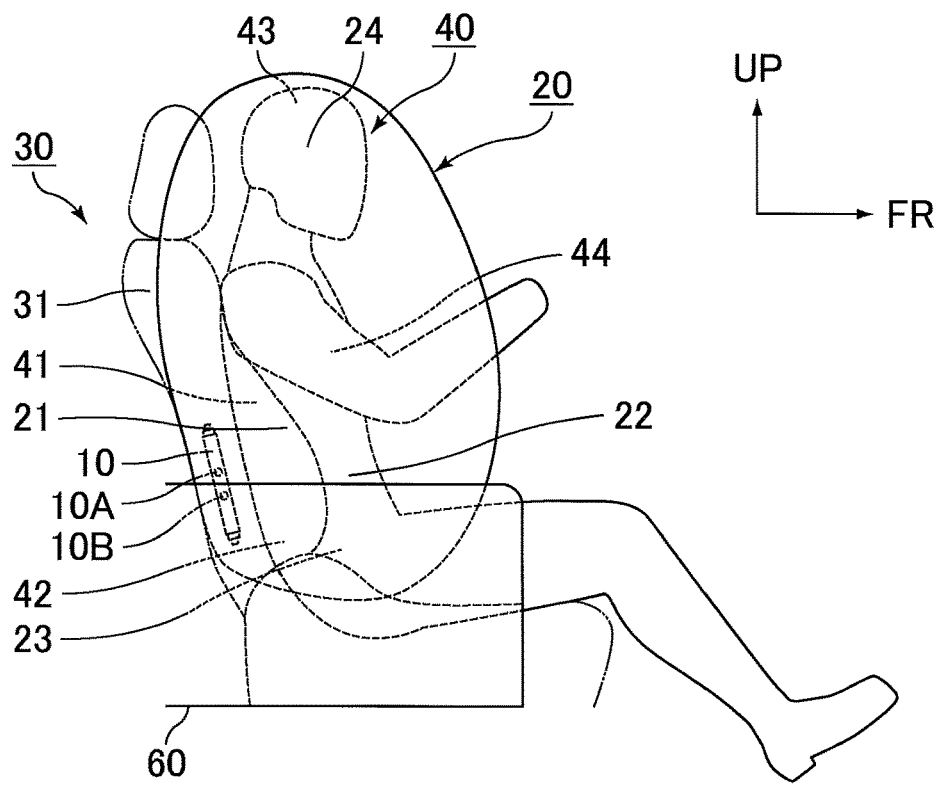
FIG. 7 is a schematic side view of the side airbag device of the embodiment in a late stage of occupant restraint by the airbag.
Figure 8:
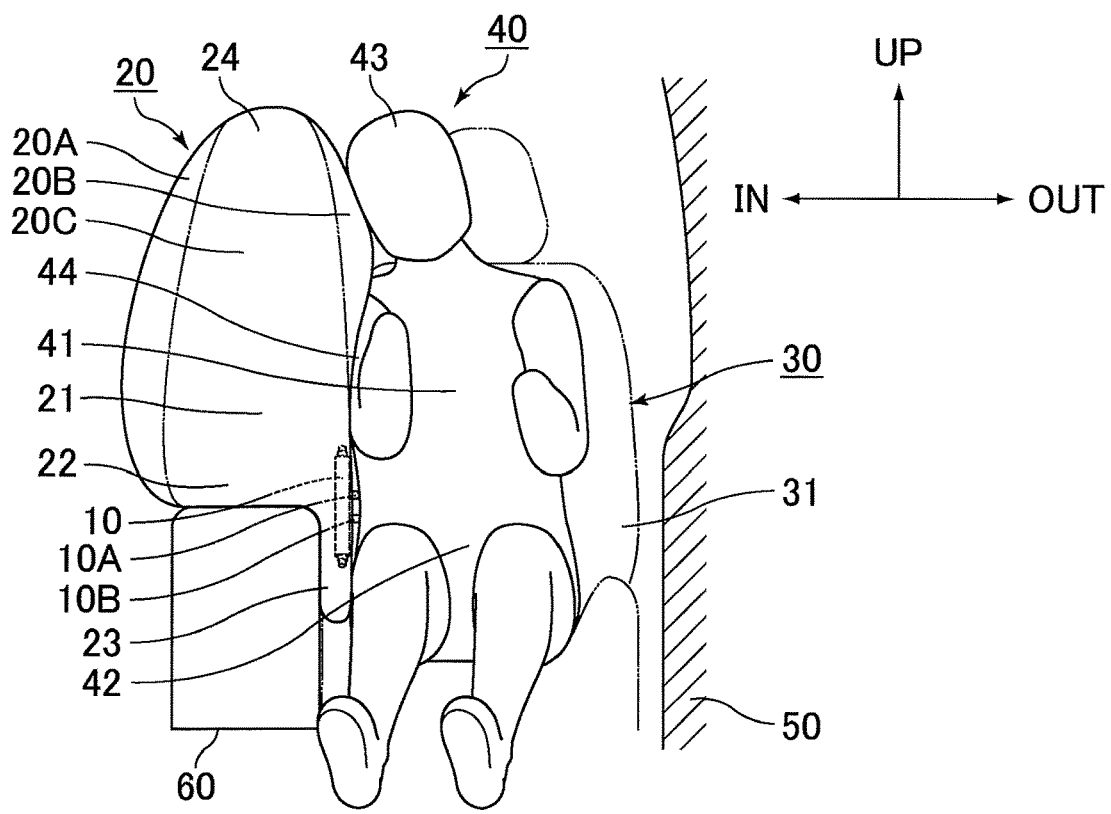
FIG. 8 is a schematic front view of the side airbag device of the embodiment in the late stage of occupant restraint by the airbag.
Figure 9:
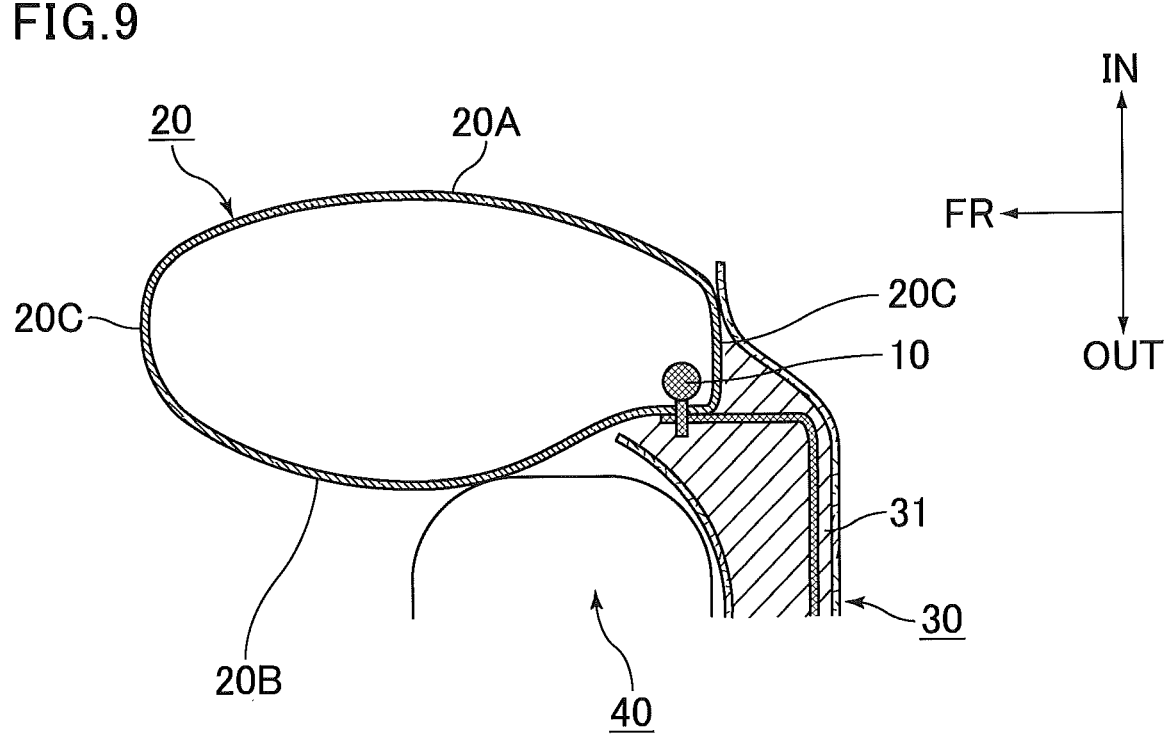
FIG. 9 is a schematic top view showing a cross section of the vicinity of an inflator in the side airbag device in FIG. 7 and FIG. 8.

FIG. 7 is a schematic side view of the side airbag device of the embodiment in a late stage of occupant restraint by the airbag. FIG. 8 is a schematic front view of the side airbag device of the embodiment in the late stage of occupant restraint by the airbag. FIG. 9 is a schematic top view showing a cross section of the vicinity of an inflator in the side airbag device in FIG. 7 and FIG. 8.

As the occupant 40 further moves to the inner side in the vehicle width direction, as shown in FIG. 8, the hip protection portion 23 is pressed between the hip 42 of the occupant 40 and the lateral portion of the console box 60. When the hip protection portion 23 is pressed, the inner pressure of the support portion 22 defined by a chamber continuous to the hip protection portion 23 increases. Since the support portion 22 and the hip protection portion 23 are defined by a continuous chamber, the inner pressure of the support portion 22 easily increases when the hip protection portion 23 is pressed.

Meanwhile, the torso protection portion 21 leans toward the inner side in the vehicle width direction when it comes into contact with the torso 41 of the occupant 40 leaning toward the inner side in the vehicle width direction. When the torso protection portion 21 leans toward the inner side in the vehicle width direction, the support portion 22 is immediately pushed onto the top surface of the console box 60, which generates a reaction force from the top surface of the console box 60. At this time, the inner pressure of the support portion 22 is high as described above, so that the magnitude of reaction force from the top surface of the console box 60 is large. Thus, when this large magnitude of reaction force is applied to the torso protection portion 21 via the support portion 22, the force of the torso protection portion 21 moving back to the position in the early stage of occupant restraint (to the outer side in the vehicle width direction) works intensely. As a result, the occupant 40 is restricted from moving to the inner side in the vehicle width direction in an early stage.

Also, as described above, since the support portion 22 and the hip protection portion 23 inflate and deploy along the top surface and side surface of the console box 60, respectively, in a front-rear view of the vehicle, the airbag 20 has a stable deployment behavior without pivoting about the corner of the console box 60. Such a stable deployment behavior of the airbag 20 also contributes to restriction of movement of the occupant 40 to the inner side in the vehicle width direction in an early stage.

In the inflated and deployed state of the airbag 20, a portion of the support portion 22 and a portion of the hip protection portion 23 respectively opposing the top surface and side surface of the console box 60 are preferably defined by a continuous single base fabric piece. For example, in the airbag 20 as shown in FIG. 3 and FIG. 4, the portion of the support portion 22 and the portion of the hip protection portion 23 respectively opposing the top surface and side surface of the console box 60 in an inflated and deployed state are defined by the continuous single base fabric piece 20A. With the portion of the support portion 22 and the portion of the hip protection portion 23 respectively opposing the top surface and side surface of the console box 60 in the inflated and deployed state being defined by a continuous single base fabric piece, the airbag 20 inflates and deploys to have a round shape with large inflation diameters at the portion of the support portion 22 and the portion of the hip protection portion 23 respectively opposing the top surface and side surface of the console box 60. Thus, the magnitude of reaction force from the top surface and side surface of the console box 60 in the inflated and deployed state increases. As a result, the airbag 20 (torso protection portion 21) exerts a larger magnitude of restraint force to prevent the occupant 40 from moving to the inner side in the vehicle width direction. Also, such inflation and deployment of the airbag 20 allow the support portion 22 and the hip protection portion 23 to come into contact with the console box 60 in an early stage.

In an inflated and deployed state, the support portion 22 is preferably pushed onto half or more of the top surface of the console box 60 in a front-rear view of the vehicle, more preferably onto the entire top surface of the console box 60 in a front-rear view of the vehicle as shown in FIG. 8. When the support portion 22 is pushed onto half or more of the top surface of the console box 60 in an inflated and deployed state, the magnitude of reaction force from the top surface of the console box 60 further increases. As a result, the airbag 20 (torso protection portion 21) has a larger magnitude of restraint force to prevent the occupant 40 from moving to the inner side in the vehicle width direction.

Preferably, the torso protection portion 21, the support portion 22, and the hip protection portion 23 are defined by a continuous chamber, and in an inflated and deployed state, there is no depression on a portion between an upper end of the torso protection portion 21 and an end on the inner side in the vehicle width direction of the support portion 22 in a front-rear view of the vehicle as shown in FIG. 8. Such a structure prevents the airbag 20 from bending between the torso protection portion 21 and the support portion 22 when the airbag 20 receives the occupant 40. As a result, the airbag 20 can stably receive the occupant 40.

The airbag 20 may further include a head protection portion 24 as shown in FIG. 8. The head protection portion 24 is provided on the upper side of the torso protection portion 21 and configured to protect the head 43 of the occupant 40. With the head protection portion 24, the airbag 20 can receive the whole body of the occupant 40. As a result, the airbag 20 can efficiently restrict movement of the occupant 40 to the inner side in the vehicle width direction.

The inflator 10 is housed in the airbag 20, and is positioned from above to below the support portion 22, more specifically from the torso protection portion 21 to the hip protection portion 23, in a side view of the vehicle as shown in FIG. 7. Also, the bolts 10A and 10B of the inflator 10 are positioned above and below the support portion 22, respectively. This means that the position where the gas is generated and the support portion 22 are relatively close to each other. Thus, when the airbag 20 inflates and deploys in response to the gas generated by the inflator 10, the gas pressure near the support portion 22 during inflation and deployment of the airbag 20 is maintained high, which secures self-supportability of the airbag 20 owing to the support portion 22. The torso protection portion 21, the support portion 22, and the hip protection portion 23 therefore do not easily swing even when the airbag 20 swings due to rapid inflation and deployment. As a result, the inflation and deployment position of the airbag 20 relative to the corner of the console box 60 is not easily shifted, so that the airbag 20 has a stable deployment behavior. Thereby, the airbag 20 restricts movement of the occupant 40 to the inner side in the vehicle width direction in an early stage.

The airbag 20 is, as shown in FIG. 9, mounted on the lateral portion of the vehicle seat 30, which is the lateral portion of the seatback 31 herein, via the inflator 10. With the inflator 10 and the airbag 20 mounted in the above manner, the torso protection portion 21, the support portion 22, and the hip protection portion 23 are fixed to the lateral portion of the vehicle seat 30, which is the lateral portion of the seatback 31 herein, via the inflator 10. This further restricts swinging of the support portion 22 near the fixed inflator 10 in the inflated and deployed state of the airbag 20. As a result, the inflation and deployment position of the airbag 20 relative to the corner of the console box 60 is not easily shifted, so that the airbag 20 has a stable deployment behavior. Thereby, the airbag 20 restricts movement of the occupant 40 to the inner side in the vehicle width direction in an early stage.

Meanwhile, when the airbag 20 receives the occupant 40 moving to the inner side in the vehicle width direction, the hip protection portion 23 inflated and deployed between the hip 42 of the occupant 40 and the lateral portion of the console box 60 may be dragged out from the position. However, since the hip protection portion 23 is fixed to the lateral portion of the vehicle seat 30, which is the lateral portion of the seatback 31 herein, as described above, the hip protection portion 23 is not easily dragged out and can stably protect the hip 42 of the occupant 40.

The airbag 20 inflated and deployed in response to the gas generated from the inflator 10 inflates into a shape as round as possible with its inner pressure. Thus, in the airbag 20 with the middle base fabric piece 20C on the front side in the vehicle as shown in FIG. 9, the portion with the largest size in the vehicle width direction in an inflated and deployed state is positioned on the front side in the vehicle. Thereby, the airbag 20 can more stably protect the occupant 40 by surrounding the occupant 40 between the portion of the airbag 20 with the largest size in the vehicle width direction and the seatback 31.

The other components of the side airbag device 1 to be used may be similar to components of conventionally known side airbag devices as appropriate.

The above embodiment is not intended to limit the scope of the invention. Each of the features in the embodiment may appropriately be deleted, supplemented, modified, and/or combined within the spirit of the invention.

For example, the embodiment above describes the case where the inflator 10 is activated when an obstacle collides with a vehicle sidewall opposing the vehicle sidewall 50 in the vehicle width direction. However, the inflator 10 may be activated when an obstacle collides with the vehicle sidewall 50. In this case, when the occupant 40 moves to the inner side in the vehicle width direction due to a cause such as swinging back after the occupant 40 is restrained by a side airbag inflated and deployed on the outer side in the vehicle width direction relative to the occupant 40 seated in the vehicle seat 30, the airbag 20 can restrain the occupant 40 in an early stage.

What is claimed is:
1. A side airbag device comprising:
an inflator configured to generate a gas; and
a bag-shaped airbag inflatable and deployable in a space above a console box and beside an inner side in a vehicle width direction relative to a vehicle seat in response to the gas upon activation of the inflator, the console box provided on an inner side in a vehicle width direction relative to the vehicle seat,
the airbag including a torso protection portion, a support portion provided on a console box side of the torso protection portion and configured to be pushed onto a top surface of the console box in an inflated and deployed state, and a hip protection portion inflatable and deployable close by a lateral portion of the console box,
the support portion and the hip protection portion being defined by a continuous chamber,
the inflator being positioned from above to below the support portion in a side view of the vehicle,
the airbag being mounted on a lateral portion of the vehicle seat via the inflator, and
the airbag further comprising a middle base fabric piece that is on a front side in the vehicle and has a shape extending along the top surface and side surface of the console box in a front-rear view of the vehicle.

2. The side airbag device according to claim 1,
wherein in an inflated and deployed state, the support portion and the hip protection portion extend along the top surface and side surface of the console box, respectively, in a front-rear view of the vehicle, and a portion of the support portion and a portion of the hip protection portion respectively opposing the top surface and side surface of the console box are defined by a continuous single base fabric piece.

3. The side airbag device according to claim 1,
wherein in an inflated and deployed state, the support portion is pushed onto half or more of the top surface of the console box in a front-rear view of the vehicle.

4. The side airbag device according to claim 3,
wherein in an inflated and deployed state, the support portion is pushed onto an entire top surface of the console box in a front-rear view of the vehicle.

5. The side airbag device according to claim 1,
wherein the torso protection portion, the support portion, and the hip protection portion are defined by a continuous chamber, and
in an inflated and deployed state, there is no depression on a portion between an upper end of the torso protection portion and an end on the inner side in the vehicle width direction of the support portion in a front-rear view of the vehicle.

6. The side airbag device according to claim 1,
wherein the airbag further includes a head protection portion provided on an upper side of the torso protection portion.

7. The side airbag device according to claim 1,
wherein an area of contact between the support portion in an inflated and deployed state and the top surface of the console box decreases toward a rear side of the vehicle.

* * * * *